Aug. 4, 1953　　　O. P. LANCE　　　2,647,616
ARTICLE-HANDLING MACHINE
Filed Oct. 11, 1951　　　3 Sheets-Sheet 1
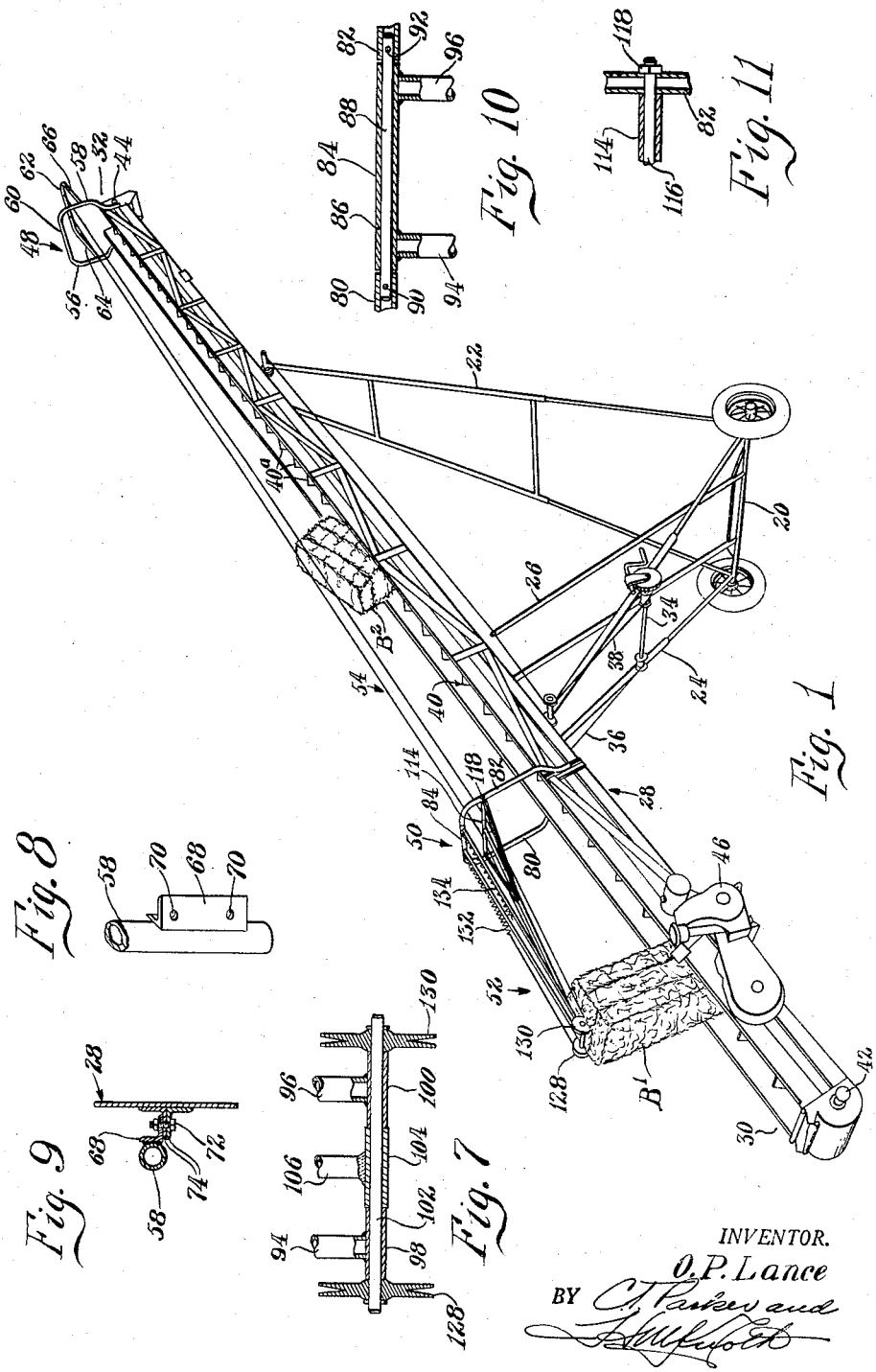
INVENTOR.
O. P. Lance
BY
Attorneys

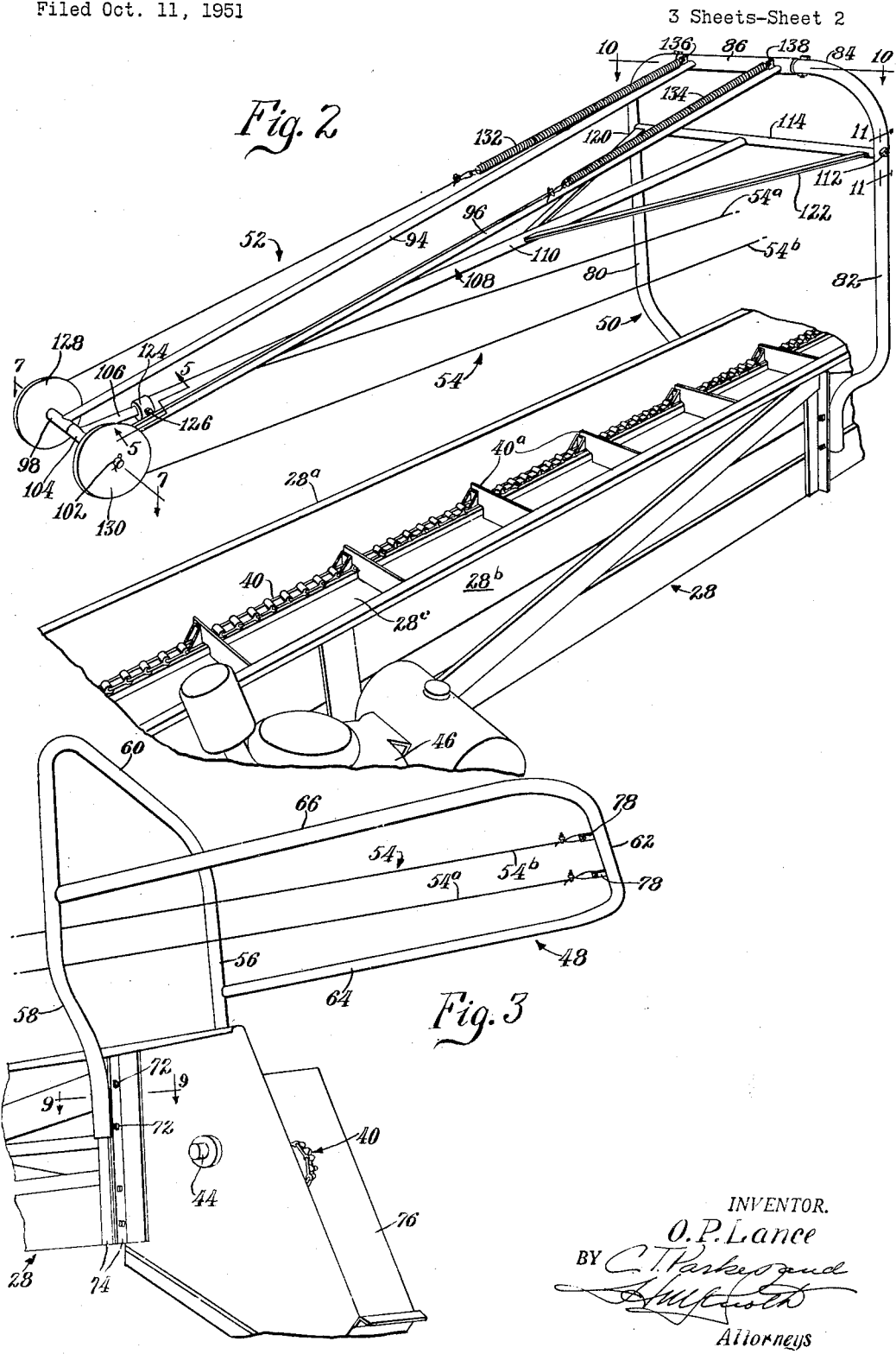

Aug. 4, 1953
O. P. LANCE
2,647,616
ARTICLE-HANDLING MACHINE
Filed Oct. 11, 1951
3 Sheets-Sheet 3
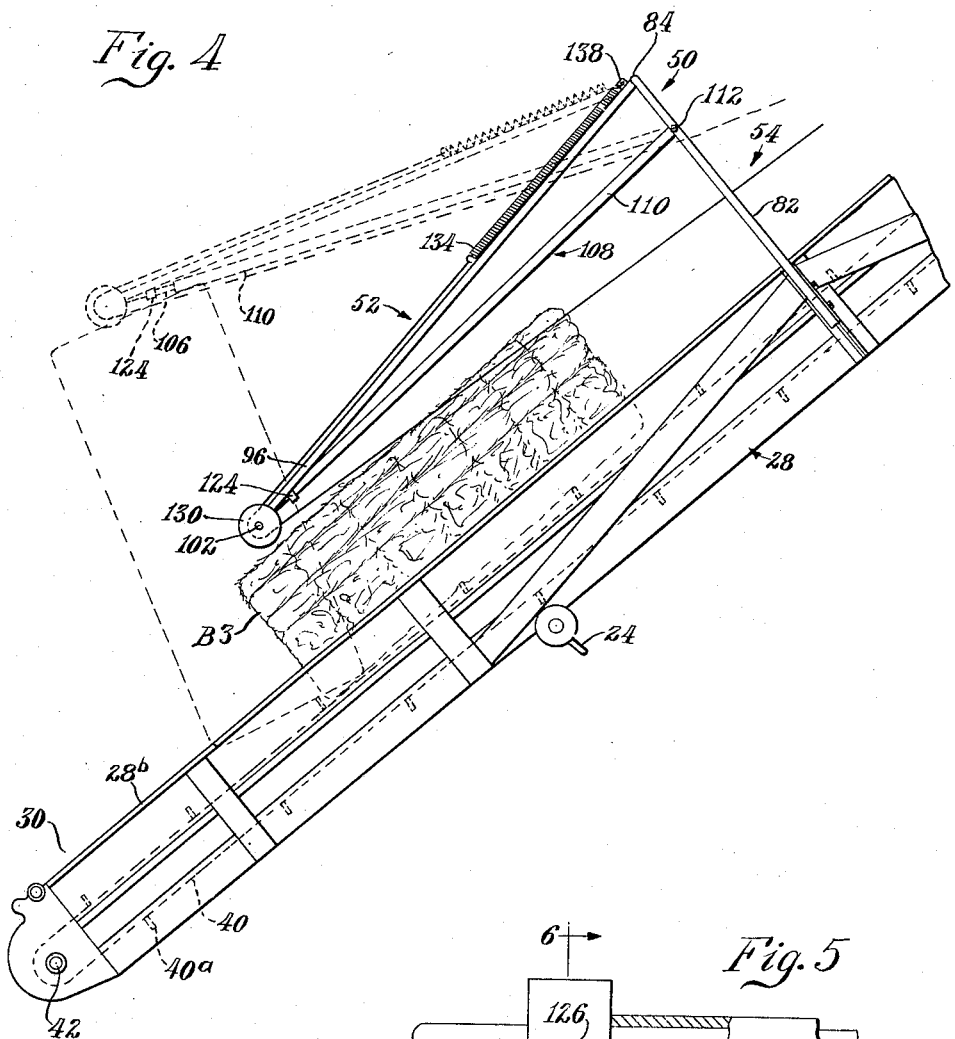
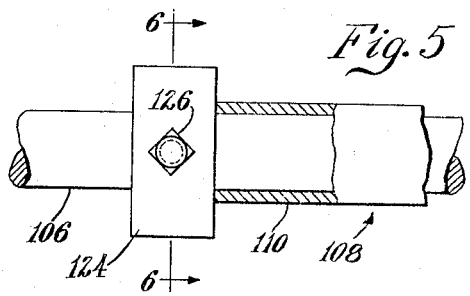
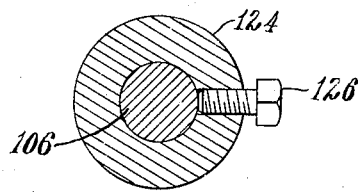
INVENTOR.
O. P. Lance Patented Aug. 4, 1953

2,647,616

UNITED STATES PATENT OFFICE 2,647,616

ARTICLE-HANDLING MACHINE

Orville P. Lance, Moline, Ill., assignor to Deere & Company, Moline, Ill., a corporation of Illinois Application October 11, 1951, Serial No. 250,842

17 Claims. (Cl. 198—160)

This invention relates to an article-handling machine and more particularly to a conveying apparatus for elevating articles such as bales of hay or straw from the ground to a higher level. More specifically, the invention relates to means for use on a bale loader or elevator for preventing retrograde movement of the bales as they are being elevated.

Bales of hay or straw as formed by conventional balers may be either cylindrical or of elongated block form. In either case, the length of such bale materially exceeds its width by about two to one. As any farmer will readily attest, a bale is one of the most difficult articles to handle, because it is fairly heavy, bulky and at times annoyingly unwieldy.

Baled hay or straw, like the same material in bulk, is customarily stored in quantity in lofts, and various devices have been used or proposed for accomplishing the elevation of the material from the ground to such lofts. More recently, the conventional grain elevator has been used for this purpose, it being found that the usual elevator, particularly one of the larger sizes, has sufficient capacity to elevate the bales. A conventional elevator of the type referred to comprises an elongated trough or ramp inclining from a lower receiving end to an upper discharge end. An endless conveyor runs in the trough for moving material from the receiving end to the discharge end. These elevators operate efficiently in the handling of corn or grain, which is relatively fluent, and it is ordinarily immaterial at what angle of elevation these machines operate. However, in the elevation of bales of hay or straw, different problems arise. The most serious problem is the tendency of the bales, when the elevator is operated at an extreme angle, to roll end over end down the elevator. The bales are loaded into the elevator so that their length lies along the length of the trough and, since the flights on the endless conveyor are designed primarily for grain, the bales are rather precariously held in the trough. Accordingly, it is expedient to provide some form of means running above the elevator for holding the bales downwardly against the endless conveyor so that they cannot roll or turn end over end down the trough. Many forms of hold-down devices have been used and others have been proposed.

However, there is another acute problem involved. This occurs in the initial loading of the bales into the trough. Conventionally, the bales are brought from the field on a flat-bed trailer or truck and must be manually dropped from the trailer or truck to the lower level of the receiving end of the elevator. Since the endless conveyor is constantly moving upwardly, the tendency of the conveyor is to seize the lower end of the bale and start it upwardly before the operator has a chance to release his hold on the bale. This initially imparts a rotating movement to the bale about its minor axis and, before the bale even has a chance to start upwardly on the conveyor, it begins to roll downwardly and interferes with the loading of the succeeding bale. Of course, the problem can be eliminated to a large extent by the exercise of care and patience on the part of the operator; but, like anything else, requirements of this nature increase the already onerous burden on the operator. Therefore, it is desirable to provide for accommodating the problem so that the bales may be speedily and rather randomly loaded into the elevator.

According to the present invention, improved bale-handling means is provided, either as an attachment for existing elevators or as part of a machine designed especially for the handling of bales. In either case, the principles of the invention are equally applicable. What is involved is the utilization of a pair of supports spaced lengthwise of the elevator trough or ramp or its equivalent. One of these supports is spaced upwardly from the receiving end of the elevator and carries arm means thereon projecting toward said receiving end, the length of the arm means being somewhat greater than the length of a bale. Hold-down means, preferably in the form of a pair of strand-like elements, extends between the supports and is associated with the arm means. Fundamentally, the bales are supposed to pass beneath the strand-like elements and thus be prevented from rolling end over end down the trough or ramp means. The arm means normally extends as a cantilever from the lower support and has a normal position in which the free end of the arm is spaced at a height above the trough substantially on the order of the width of a bale. However, the arm means is swingable upwardly and, because of its length, the free end of the arm means may attain a height substantially on the order of a bale standing on the conveyor with its length upright. The arm means is biased downwardly so that when the lower end of the bale is moved upwardly by the conveyor, the free end of the arm means presses downwardly on the upper end of the bale. The strand-like elements are extended out to the free end of the arm means so as to provide an under portion on the arm means which continues to exert a downward force on the bale, ultimately guiding the bale under the major portion of the strand-like elements. Primarily, what happens is that as soon as the initially loaded bale begins to turn upwardly, the arm means presses downwardly on it and, although the arm means may allow the bale to turn end over end once, the arrangement is such that this turning of the bale ultimately facilitates its proper travel up the elevator.

It is an object of the invention to provide the improved hold-down and guiding device of simple and inexpensive construction so that, as aforesaid, it may be utilized in the form of an attachment for conventional elevators or as part of a machine especially designed for handling bales.

Further objects of the invention include the provision of apparatus of the character disclosed that has relatively few moving parts and that is not likely to get out of order; the use of strand-like elements such as cables or wires, which lend themselves readily to the functioning of the particular device; the provision of a device that will suitably handle either cylindrical or rectangular bales; and the provision of various other details of design that will accomplish the major object of efficiently handling bales for the purposes above referred to.

The foregoing and other important objects and desirable features inherent in and encompassed by the invention will become apparent as a preferred embodiment of the invention is fully disclosed in the following detailed description and accompanying sheets of drawings in which Figure 1 is a perspective view of an elevator embodying the hold-down and guiding means;

Figure 2 is a fragmentary perspective view on an enlarged scale showing the details of the lower support;

Figure 3 is a fragmentary perspective view on approximately the scale of Figure 2 and showing the upper support;

Figure 4 is a fragmentary side elevational view of the lower portion of the structure, showing in full lines the operation of the device with a properly loaded bale and in dotted lines the functioning of the arm means in connection with a bale standing its end on the elevator;

Figure 5 is a fragmentary sectional view on an enlarged scale as seen substantially along the line 5—5 of Figure 2;

Figure 6 is a transverse sectional view as seen along the line 6—6 of Figure 5;

Figure 7 is a sectional view on an enlarged scale as seen along the line 7—7 of Figure 2;

Figure 8 is a fragmentary perspective view of the lower portion of one of the supports, illustrating the manner in which this support may be attached to the elevator trough;

Figure 9 is a sectional view on an enlarged scale as seen along the line 9—9 of Figure 3;

Figure 10 is a fragmentary sectional view on an enlarged scale as seen substantially along the line 10—10 of Figure 2; and Figure 11 is a fragmentary sectional view as seen along the line 11—11 of Figure 2, the view being drawn on an enlarged scale.

As stated above, the principles of the invention are equally applicable whether the arrangement embodying the same is utilized as an attachment for existing elevators or as part of a specially designed machine for handling bales. Accordingly, the present disclosure is to be taken as representative only and not as supporting the importation of limitations on the scope of the invention. Further, the use of such expressions as "bottom," "top," "length," "width," etc., is for convenience only, due regard being had to the various equivalent possibilities that will readily occur from the disclosure.

Figure 1 best shows the over-all picture. The elevator chosen for the purposes of illustration comprises a transverse wheeled axle 20 having an adjustable derrick 22, a reach 24 and a mast 26. Trough or ramp means 28 is supported on the derrick and reach and inclines from a lower receiving end 30 to an upper discharge end 32. Winch means 34 may operate through a pair of cables 36 and 38 to move the derrick 22 lengthwise under the bottom of the trough means 28 to effect raising or lowering of the discharge end 32 of the trough means. Any other suitable basic structure may be utilized. That illustrated is disclosed in detail in U. S. Patent 2,568,865.

The upper portion of the trough or ramp means 28 comprises a pair of transversely spaced apart, elongated parallel sides 28a and 28b cross-connected by a floor 28c which provides an upper surface for the ramp and over which moves the upper run of an endless conveyor 40. This conveyor may be of any conventional construction, such as one that includes a pair of transversely spaced apart chains (one of which is clearly visible in each of Figures 2 and 3) cross-connected by a plurality of flights or slats 40a. Shafts 42 and 44 respectively at the receiving and discharge ends 30 and 32 of the trough carry the conveyor. The conveyor may be driven in any suitable manner. In the present case, an internal combustion engine 46 is indicated as the source of power.

The improvement comprises essentially a first or upper support designated generally by the numeral 48, a second or lower support 50, which includes arm means 52, and bale-hold-down means designated generally by the numeral 54. As will be generally observed in Figure 1, bales are loaded successively into the lower or receiving end 30 of the elevator to be carried upwardly by the conveyor 40 to the discharge end 32. If a bale stands upright as indicated by the bale $B^1$ in Figure 1, the arm means 52 functions to lay the bale down so that its length lies along the length of the trough or ramp 28, whereby the bale will pass beneath and be held down by the hold-down means 54, as indicated by the position of the bale $B^2$ in Figure 1. The details of the various components will follow.

The first or upper support 48 is in the form of an inverted U or otherwise of arched construction having a pair of upright members 56 and 58 forming the legs of the U and cross-connected by a cross member or bight 60. Because of the construction of the upper support 48, a second bight or cross member 62 forms part of the arch and is joined to the legs 56 and 58 by integral members 64 and 66. The support 48 is fixed to the receiving end 32 of the trough 28 in such manner that the top portion of the support, as represented by the cross member or bight 62, is spaced above the conveyor or bale-advancing means 40 at a height substantially on the order of the width of a bale.

A typical mounting means for the support 48 is illustrated in Figures 8 and 9. As shown, the leg 58 has a lower portion to which may be fixed as by welding a short angle 68 apertured at 70 to receive a pair of bolts 72. In the particular elevator shown, the trough 28 is made up of a plurality of sections joined together in end-to-end relationship as by a pair of upright angles 74. The bolts 72 may be those used to join an upper discharge section 76 to the last elongated section (Figure 3) or may be additionally provided as longer bolts. As suggested, the mounting means is only representative and the details thereof may be varied according to individual desires. It will be understood, of course, that the leg 56 of the arched support 48 may be similarly constructed so that it may be attached to the opposite side of the trough or ramp means 28.

The trough member or bight 62 of the support 48 is provided with a pair of transversely spaced apart attaching lugs 78 apertured to receive the bale-hold-down means 54. These lugs are spaced transversely apart a distance less than the width of a bale so that the hold-down means 54 adequately controls the bale. The means 54 takes the form of a pair of strand-like elements 54a and 54b, both of which may be wires, cables, etc., the particular nature of which constitutes no limitation upon the applicability of the invention for the purposes intended.

The lower support 50 likewise comprises an arch or inverted U having a pair of upright members 80 and 82 forming legs cross-connected by a cross member or bight structure 84. As best shown in Figures 2 and 10, the cross structure 84 includes a hinge or pivot for the arm means 52. In a preferred construction, the upper inturned ends of the legs 80 and 82 terminate in coaxially spaced apart relationship to receive therebetween a short tubular member 86, and a shaft 88 sufficiently long to extend through the tubular member 86 and part way into the inward extensions of the legs 80 and 82 is secured in place, as by a pair of bolts or pins 90 and 92. Any other form of construction may be utilized. The fundamental purpose is the provision of a hinge or pivot on the principal axis of the bight or cross member structure 84 of the support 50. The lower end of the legs 80 and 82 may be secured to the trough 28 by means such as that illustrated in Figures 8 and 9. This will be evident from the drawings without further description.

The arm means 52 comprises a pair of elongated arm members 94 and 96 extending in parallel side-by-side relationship from the hinge axis at 84 toward the receiving end 30 of the elevator trough 28. The members 94 and 96 are each rigidly secured as by welding at one end to the transverse tubular member 86 (Figure 10) and extend to free ends remote from the support 50. The free end of the arm member 94 is provided with a short tubular section 98 and a similar section 100 is provided at the free end of the arm member 96. These sections are preferably respectively welded to the arm members so as to form integral parts thereof. These free end portions are transversely bored or apertured to receive a short transverse pivot member or shaft 102 which passes through an intermediate tubular member 104 comprising an apertured end portion for one member 106 of adjustable brace means designated generally by the numeral 108. This brace means includes a second member 110, this member preferably being in the form of a tube, while the other member 106 is in the form of a rod. The two members 106 and 110 are telescopically related or otherwise mutually self-supporting relative to each other, with the result that the two members are relatively extensible and contractible to accommodate variations in length thereof. The brace means 108 is pivoted on a transverse axis at 112 to the support 50 just below the hinge axis at 84 for the arm members 94 and 96. The brace means at this point includes a transverse tubular member 114 through which is passed a pivot rod or shaft 116 threaded at its opposite outer ends to receive securing nuts 118, only one of which appears in the drawings. However, Figure 11 will clearly illustrate the nature of the construction. Diagonal braces 120 and 122 interconnect the transverse member 114 and the tubular brace member 110 to rigidify the structure.

Since the arm means 52 is pivoted at 84 on the support 50, the free end of the arm means is free to rise and fall about this hinge or pivot axis. Changes in the vertical position of the arm means 52 is accommodated by the extensible and contractible brace means 108, the member 106 sliding within the tubular member 110. In order that the lowermost position of the arm means 52 may be determined, stop means is provided. This means preferably takes the form of an abutment collar 124 fixable in any of a plurality of selected positions on the rod or member 106 as by means of a set screw 126 (Figures 5 and 6). Hence, the collar 124 abuts the end of the brace member 110 when the arm means 52 is in its lowermost position. Normally, this lowermost position will be determined on the basis of that position of the free end of the arm means 52 in which such free end is at a height above the conveyor 40 substantially on the order of the width of a bale. In other words, the free end of the arm means will be at the same level (relative to the conveyor 40) as the cross member 62 of the upper support 48. This is the optimum height or level for determining the normal position of the hold-down means 54. The cables or wires 54a and 54b of the means 54 extend from their connection to the transverse member or bight 62 of the support 48 lengthwise of the trough 28 and pass beneath the transverse tubular member 114 of the brace means and extend about a pair of rotatable means in the form of sheaves 128 and 130 journaled on the shaft or pivot member 102 at the free end of the arm means 52. The cables or wires then pass rearwardly and upwardly and are connected respectively by springs 132 and 134 to the upper part of the support 50. In a preferred construction, the arm members 94 and 96 of the arm means are provided with a pair of transversely spaced apart apertured lugs 136 and 138 to which the opposite ends of the springs 132 and 134 are respectively connected. The springs thus provide means for tensioning the hold-down means 54 between the supports 48 and 50.

In operation, the machine is set up as illustrated in Figure 1. The operator preferably places a bale in position as shown by the bale B³ in Figure 4. If care is exercised in loading the bale, the bale will move upwardly by the advancing means 40 and will pass beneath the hold-down means 54. Since the arm means 52 is biased by its own weight and also by the tensioned hold-down means 54, it is expected that the bale will move without difficulty through the arched support 50 and on its way up the elevator trough. As soon as the bale passes through the support 50, any upward pressure that it might exert against the hold-down means is resisted by the hold-down means and arm means and the arm means cannot move upwardly, since the upward pressure exerted by the bale will tend to operate through the hold-down means to exert a downward force on the arm means. Normally no difficulty is experienced with the bales once they pass the support 50 and they are efficiently guided and held down by the means 54 until they are discharged at the discharge end 32 of the elevator.

However, some difficulty may be experienced in the initial loading of the bales. For example, when an operator is placing a bale in the trough, the upwardly moving advancing means 40 tends to seize the lower end of the bale. Since the operator may still be holding the upper end of the bale, rotation in a counterclockwise direction (as viewed in Figure 4) is imparted to the bale. Because of the extreme angle of the elevator trough, this initial rotation is sufficient to cause the bale to tend to continue such rotation. As it does so, it is engaged by that portion of the hold-down means 54 between the support 50 and the free end of the arm means. When the bale attains a position in which it stands upright on the trough, as indicated in dotted lines in Figure 4, the free end of the arm means, and particularly the rotatable bale-engaging means 128 and 130, engages the top of the bale and retards its rotation. That is to say, the arm means serves as means for holding the upper end of the bale while the lower end thereof is moved by the advancing means. As the lower end moves upwardly on the elevator, the arm means, being biased downwardly, exerts a downward force on the bale and tends to lay the bale properly in the trough and on the advancing means 40. It will be understood that the arm means moves downwardly rather rapidly and exerts such pressure as to prevent the bale from again bouncing upwardly and continuing again its counterclockwise rotation. The length of the arm means is such that it may readily attain the height indicated in dotted lines in Figure 4, which height is substantially on the order of the length of the bale.

The hold-down means 54 thus normally operates at a level spaced above the conveyor 40 at a height on the order of the width of the bale, but the forward or entry end portion thereof, as represented by the extent thereof between the support 50 and the free end of the arm means 52, serves as a guide that is yieldable upwardly to accommodate turning bales. As stated, the guide serves also to introduce the bales properly to the major portion of the hold-down means as represented by that part thereof that extends between the supports 50 and 48.

When the arm means 52 attains its maximum position as illustrated in dotted lines in Figure 4, the cables or wires 54a and 54b of the hold-down means 54 are stretched between the connections of the opposite ends thereof to the supports 50 and 48, and the transverse member 114 at the pivot 112 of the brace means 108 to the support 50 serves as a limit to prevent too great an upward displacement of that portion of the hold-down means 54 in the vicinity of the support 50.

Stated broadly, the hold-down means 54 is capacitated for repeated bending and straightening substantially in the vicinity of the transverse member 114 of the lower or front support 50. The arm means 52, being constructed to rise and fall as explained, functions as a yielding retarder for receiving bales, whether they are introduced lengthwise or upright.

Other features of the invention reside in the sub-combinations of the components thereof, which may be readily provided as attachments or auxiliary devices for use with elevators of conventional design. Still other features of the invention not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. In an elevator for handling bales of the type in which the length of each bale materially exceeds its width and wherein such elevator includes a trough inclined from a lower, bale-receiving end to an upper, bale-discharge end and advancing means movable lengthwise of the trough to move bales from said receiving end to said discharge end, the improvement comprising: a first support mountable at the discharge end of the trough to rise therefrom to a top portion at a height above the advancing means substantially on the order of the width of a bale; a second support mountable on the trough intermediate said receiving and discharge ends to rise above the advancing means to a top portion at a height substantially on the order of the width of a bale; downwardly biased arm means having an end adjacent to the top portion of the second support and positionable to extend lengthwise of the trough to a free end proximate to the receiving end of the trough; means hinging the arm means at said one end to the second support for vertical swinging of the free end upwardly from and downwardly toward a normal position in which said free end is at a height above the advancing means substantially on the order of the width of a bale, said arm means being of such length that its free end when swung upwardly may attain a height above the advancing means substantially on the order of the length of a bale; means for limiting downward swinging of the free end of the arm means to its normal position; and a flexible element secured at one end to the top portion of the first support, running lengthwise of the trough and passing immediately under the top portion of the second support, and extending to the free end of the arm means and being secured to the arm means.

2. In an elevator for handling bales of the type in which the length of each bale materially exceeds its width and wherein such elevator includes a trough inclined from a lower, bale-receiving end to an upper, bale-discharge end and advancing means movable lengthwise of the trough to move bales from said receiving end to said discharge end, the improvement comprising: a support mountable at the discharge end of the trough to rise therefrom to a top portion at a height above the advancing means substantially on the order of the width of a bale; a bale-guide member having a downwardly biased bale-engaging part positionable over the trough adjacent to the receiving end of the trough; means for supporting the bale-guide member on the trough for movement of its bale-engaging part from a normal position spaced above the advancing means at a height substantially on the order of the width of a bale to a higher position at a height above the advancing means substantially on the order of the length of a bale; means limiting downward movement of said part to its normal position; and elongated bale-hold-down means running lengthwise of the trough normally at a height above the trough substantially on the order of the width of a bale, and secured at one end portion to the top portion of the support and at its other end portion to the bale-engaging part of the bale-guide member whereby said other end portion of the elongated means may rise and fall with said bale-engaging part.

3. The invention defined in claim 2, including: a second support having means for the mounting thereof on the trough intermediate the bale-engaging part and the first support at the discharge end of the trough and engaging an intermediate portion of the elongated bale-hold-down means to limit upward displacement of said portion of said elongated means to a height above the advancing means less than the length of a bale; and said elongated means being flexible at least in the vicinity of the engagement thereof with the second support so that only that portion of the elongated means between the second support and the bale-engaging part may rise with the latter to a height above the advancing means substantially on the order of the length of a bale.

4. The invention defined in claim 2, further characterized in that: the elongated means comprises at least one strand-like element yieldably tensioned between the bale-engaging part and the support.

5. In an elevator for handling bales of the type in which the length of each bale materially exceeds its width and wherein such elevator includes a trough inclined from a lower, bale-receiving end to an upper, bale-discharge end and advancing means movable lengthwise of the trough to move bales from said receiving end to said discharge end, the improvement comprising: a first support mountable at the discharge end of the trough to rise therefrom to a top portion at a height above the advancing means substantially on the order of the width of a bale; a second support mountable on the trough intermediate said receiving and discharge ends to rise above the advancing means to a top portion at a height substantially on the order of the width of a bale; elongated bale-hold-down means running between and sustained by and at the height of the top portions of the supports; downwardly biased arm means having a hinged connection at one end on a transverse axis to the second support to extend lengthwise of the trough generally as a continuation of the bale-hold-down means; means limiting downward movement of the arm means about said axis to a normal position in which the free end of the arm means is substantially at the height of the bale-hold-down means; said hinged connection providing for upward swinging of the arm means, and said arm means being of such length that its free end when swung upwardly may attain a height above the advancing means substantially on the order of the length of a bale; and said arm means including an under portion leading to the bale-hold-down means to guide a bale to said bale-hold-down means.

6. In an elevator for handling bales of the type in which the length of each such bale materially exceeds its width, and wherein the elevator includes elongated ramp means having a lower, bale-receiving end and an upper, bale-discharge end and bale-advancing means movable lengthwise over the upper surface of the ramp means to move bales from said receiving end to said discharge end, the improvement comprising: bale-hold-down means positionable to run lengthwise of the ramp means and over the advancing means at a height thereabove substantially on the order of the width of a bale so that a bale moved by the advancing means and lying on its side with its length along the ramp means will pass beneath said hold-down means; said hold-down means having an entry end portion and an exit end portion arrangeable respectively proximate to the receiving and discharge ends of the ramp means; support means for mounting at the discharge end of the ramp means to sustain the exit end of the hold-down means substantially at the aforesaid height; second support means for mounting adjacent to but spaced upwardly from the receiving end of the ramp means to sustain an intermediate portion of the hold-down means at said height; said entry end portion of the hold-down means being flexibly related to the remainder of the hold-down means at least on a transverse line at the second support so as to be capable of vertical movement upwardly from and biased return movement downwardly to the aforesaid height; and carrier means mountable on the ramp means and movable upwardly and downwardly to carry the entry end portion of the hold-down means for movement upwardly from said height to a height above the movable means substantially on the order of the length of a bale so as to receive a bale standing on the advancing means with its length upright.

7. The invention defined in claim 6, in which: the hold-down means comprises at least one strand-like element tensioned between the first support and the carrier means and capacitated for repeated bending and straightening in a vertical plane about said transverse line at the second support.

8. In an elevator for handling bales of the type in which the length of each such bale materially exceeds its width and wherein the elevator includes elongated ramp means having a lower, bale-receiving end and an upper, bale-discharge end and advancing means movable over the upper surface of the ramp means to advance bales from said receiving end to said discharge end, the improvement comprising: first support means fixable to the ramp means at its discharge end and comprising an inverted U having its legs spaced apart transversely greater than the width but less than the length of a bale and arrangeable with its bight spaced above and crosswise of the advancing means at a height substantially on the order of the width of a bale; second support means fixable to the ramp means adjacent to its receiving end and having its legs and bight arranged substantially as in the case of the first support; and a pair of parallel strand-like flexible elements connected respectively at opposite ends to and tensioned between the bights of the support means to stretch lengthwise of the ramp means at the aforesaid height and being spaced apart transversely less than the width of a bale to engage the top of a bale lying on the advancing means with its length along the ramp means.

9. In an elevator for handling bales of the type in which the length of each such bale materially exceeds its width and wherein the elevator includes elongated ramp means having a lower, bale-receiving end and an upper, bale-discharge end and advancing means movable over the upper surface of the ramp means to advance bales from said receiving end to said discharge end, the improvement comprising: first support means fixable to the ramp means at its discharge end and comprising an upright member at one side of the ramp means and a cross member connected to the upright member and spaced above and crosswise of the advancing means at a height substantially on the order of the width of a bale; second support means fixable to the ramp means adjacent to its receiving end and having an upright member and a cross member arranged substantially as in the case of the first support; and a strand-like flexible element connected respectively at opposite ends to and tensioned between the cross members of the support means to stretch lengthwise of the ramp means at the aforesaid height to engage the top of a bale lying on the advancing means with its length along the ramp means.

10. The invention defined in claim 9, in which: a vertically swinging, downwardly biased arm is connected at one end to the second support means to extend beyond said second support means in the direction of the receiving end of the ramp means with the free end of said arm in a normal position at the aforesaid height; means is cooperative with the arm to limit downward swinging of the free end of the arm to said normal position; the strand-like element extends beyond the cross member of the second support and is carried by the free end of the arm, said arm being swingable upwardly to carry the extended portion of the strand-like element therewith in the presence of a bale standing on the advancing means with its length upright.

11. For an elevator of the character described, bale-guide means comprising: a support in the form of an inverted U having upright legs spaced apart to receive a bale therebetween and a bight cross-connecting the tops of the legs; means on the lower portions of the legs for attachment thereof to an elevator; arm means hinged to the bight of the support on an axis transverse to the legs and extending to a free end remote from said bight; means on the support providing a pivot parallel to the hinge axis and spaced from said hinge axis lengthwise of the legs; brace means including a pair of relatively extensible and contractible members interconnected for the mutual support of each other, one member being connected to said pivot means and the other member being pivotally connected to the free end of the arm means on an axis parallel to the pivot and hinge axes; and means adjustable on one of the brace members and cooperative with the other brace member for limiting the relatively contractibility of the brace means.

12. The invention defined in claim 11, further characterized in that: the pivotal connection of said one brace member to the free end of the arm comprises a shaft; and rotatable bale-engaging means is carried by said shaft.

13. The invention defined in claim 12, further characterized in that: the rotatable means is in the form of a sheave having a peripheral groove adapted to receive a strand-like element.

14. The invention defined in claim 11, further characterized in that: the arm means comprises a pair of arm members extending in side-by-side relationship from the hinge axis and having coaxially apertured free end portions spaced apart transversely; said one brace member that is connected to the free end of the arm means includes a portion apertured coaxially with the free ends of the arm members; and said pivotal connection between the arm means and the brace means includes a pivot member passing through said three apertured portions.

15. The invention defined in claim 14, further characterized in that: said pivot member comprises a shaft projecting at opposite ends transversely beyond the free end portions of the arms; and rotatable bale-engaging means are carried by the projecting shaft portions.

16. In an elevator for handling bales of the type in which the length of each bale materially exceeds its width and wherein such elevator includes a trough inclined from a lower, bale-receiving end to an upper bale-discharge end and advancing means movable lengthwise of the trough to move bales from said receiving end to said discharge end, the improvement comprising: a first support mountable at the discharge end of the trough means and having a portion positionable at a height above the advancing means on the order of the width of a bale; a second support mountable at the receiving end of the trough means; bale-retarding means carried by and ahead of the second support for preventing downhill end-over-end rotation of a bale, said retarding means being for movement from a first position at a height above the advancing means on the order of the width of a bale to a second position at a height above the advancing means on the order of the length of a bale, said means being normally biased to its first position and yieldable upwardly to its second position; and bale-hold-down means running lengthwise of the trough means between the first support and the retarder means at a normal height above the advancing means on the order of the width of a bale, said hold-down means being flexible in the vicinity of the retarder means so that the portion thereof proximate to the retarder means may rise and fall with said retarder means to accommodate a bale standing upright on the advancing means.

17. In an elevator for handling bales of the type in which the length of each such bale materially exceeds its width and wherein the elevator includes elongated ramp means having a lower, bale-receiving end and an upper, bale-discharge end and advancing means movable over the upper surface of the ramp means to advance bales from said receiving end to said discharge end, the improvement comprising: first support means flexible to the ramp means at its discharge end and comprising an inverted U having its legs spaced apart transversely greater than the width of a bale and arrangeable with its bight spaced above and crosswise of the advancing means at a height greater than the width of a bale, and arm means connected at one end to the first support means and projecting beyond the discharge end to a free end at a height above the advancing means substantially equal to the width of a bale; second support means fixable to the ramp means adjacent to its receiving end and having its legs and bight arranged substantially as in the case of the first support, and second arm means connected at one end to the second support means and projecting downhill away from the second support means to have a free end disposed at a height above the advancing means substantially equal to the width of a bale; and a pair of parallel strand-like flexible elements connected respectively at opposite ends to and tensioned between the free ends of the arm means and spaced below the bights of the two support means to stretch lengthwise of the ramp means at the aforesaid height of said free ends and being spaced apart transversely less than the width of a bale to engage the top of a bale lying on the advancing means with its length along the ramp means.

ORVILLE P. LANCE.

References Cited in the file of this patent
UNITED STATES PATENTS

| Number | Name | Date |
|---|---|---|
| 1,853,253 | Bennett | Apr. 12, 1932 |
| 2,038,809 | Tallman et al. | Apr. 28, 1936 |
| 2,507,627 | Friedrich | May 16, 1950 |
| 2,597,219 | Appel | May 20, 1952 |
| 2,597,220 | Appel | May 20, 1952 |